(12) United States Patent
Takahasi et al.

(10) Patent No.: US 7,858,709 B2
(45) Date of Patent: Dec. 28, 2010

(54) AQUEOUS DISPERSION ADHESIVE COMPOSITION AND ADHESIVE FILM

(75) Inventors: Toshitaka Takahasi, Osaka (JP); Kenichi Okada, Osaka (JP); Yousuke Makihata, Osaka (JP); Kuniaki Inui, Osaka (JP); Taiki Shimokuri, Osaka (JP); Mika Okada, Osaka (JP); Namiko Murayama, Osaka (JP)

(73) Assignee: Nitto Denko Corporation, Osaka (JP)

( * ) Notice: Subject to any disclaimer, the term of this patent is extended or adjusted under 35 U.S.C. 154(b) by 453 days.

(21) Appl. No.: 12/149,445

(22) Filed: May 1, 2008

(65) Prior Publication Data

US 2008/0281038 A1 Nov. 13, 2008

(30) Foreign Application Priority Data

| May 2, 2007 | (JP) | ............................. 2007-121702 |
| Jun. 21, 2007 | (JP) | ............................. 2007-163931 |
| Apr. 9, 2008 | (JP) | ............................. 2008-101755 |

(51) Int. Cl.
*C09J 143/02* (2006.01)
*C09J 143/04* (2006.01)
*C09J 133/08* (2006.01)
*C09J 7/00* (2006.01)

(52) U.S. Cl. ............... 525/326.5; 525/326.6; 525/329.7; 525/330.3; 156/502

(58) Field of Classification Search .............. 525/326.5, 525/326.6, 329.7, 330.3; 156/502
See application file for complete search history.

(56) References Cited

U.S. PATENT DOCUMENTS

2002/0032250 A1 * 3/2002 Okazaki et al. ............... 522/83
2006/0121204 A1 * 6/2006 Nakae et al. ................. 427/402

FOREIGN PATENT DOCUMENTS

JP 2001-254063 9/2001

* cited by examiner

*Primary Examiner*—Kelechi C Egwim
(74) *Attorney, Agent, or Firm*—Jean C. Edwards, Esq.; Akerman Senterfitt LLP

(57) ABSTRACT

The aqueous dispersion adhesive composition contains an aqueous dispersion copolymer obtained by reacting of a reaction component containing alkyl (meth)acrylate whose linear or branched alkyl group has 4 to 18 carbon atoms, (meth) acrylic acid, a phosphoric acid group-containing vinyl monomer and an alkoxysilyl group-containing vinyl monomer to react; and a crosslinking agent having reactivity with a carboxyl group. In the aqueous dispersion adhesive composition, an amount of the crosslinking agent is from 0.07 to 4 parts by weight per 100 parts by weight of the aqueous dispersion copolymer, and in an adhesive layer made of the aqueous dispersion adhesive composition, an elongation at 90° C. is 200% or less.

7 Claims, 1 Drawing Sheet

AQUEOUS DISPERSION ADHESIVE COMPOSITION AND ADHESIVE FILM

CROSS REFERENCE TO RELATED APPLICATIONS

The present application claims priority from Japanese Patent Application No. 2007-121702 filed on May. 2, 2007, Japanese Patent Application No. 2007-163931 filed on Jun. 21, 2007 and also claims priority from Japanese Patent Application No. 2008-101755 filed on Apr. 9, 2008, the content of each of which is hereby incorporated by reference in their entirety.

BACKGROUND OF THE INVENTION

1. Field of the Invention

The present invention relates to an aqueous dispersion adhesive composition and an adhesive film.

2. Description of Related Art

Heretofore, optical films such as polarizing film, phase difference film, luminance improving film and view-angle expansion film have been used in various industrial applications and, for example, these optical films are used for sticking onto image display devices such as liquid crystal display, organic electroluminescence device (organic EL display device) and plasma display panel (PDP).

As the optical film, an adhesive optical film including an optical film laminated with an adhesive is known.

In recent years, from the viewpoint of environmental burden, it is desirable to reduce the use of organic solvents, and shifting from solvent adhesives using an organic solvent as a solvent to aqueous dispersion adhesive using water as a dispersion medium is desired.

As such the aqueous dispersion adhesive, for example, there has been proposed a pressure-sensitive adhesive composition having an emulsion of a copolymer in which 2-ethylhexyl methacrylate is copolymerized in an amount of 10 to 50% by weight of the whole copolymer, the copolymer having a glass transition temperature of −25° C. or less (cf. for example, Japanese Unexamined Patent Publication No. 2001-254063).

SUMMARY OF THE INVENTION

Conventional aqueous dispersion adhesives including those disclosed in the above-mentioned Japanese Unexamined Patent Publication No. 2001-254063 show particularly low adhesion to a hydrophilic adherend such as glass, and it has therefore difficulty to firmly stick to a glass substrate used for an image display device, although adhesion to a hydrophobic adherend such as polyolefin is improved.

With respect to an aqueous dispersion adhesive to be laminated on an optical film, excellent heat resistance and moisture resistance, which do not cause deterioration of adhesion due to severe heating and humidifying, are required.

The aqueous dispersion adhesive mentioned above, however, has a problem such that air bubbles and distortions occur due to severe heating and humidifying, resulting in deterioration of optical characteristics.

An object of the present invention is to provide an aqueous dispersion adhesive composition which shows excellent adhesion with a substrate and has excellent heat resistance and moisture resistance, and a pressure-sensitive adhesive film including an adhesive layer made of the aqueous dispersion adhesive composition.

The aqueous dispersion adhesive composition of the present invention comprises an aqueous dispersion copolymer obtained by reacting of a reaction component comprising alkyl (meth)acrylate whose linear or branched alkyl group has 4 to 18 carbon atoms, (meth)acrylic acid, a phosphoric acid group-containing vinyl monomer and an alkoxysilyl group-containing vinyl monomer; and a crosslinking agent having reactivity with a carboxyl group, wherein an amount of the crosslinking agent is from 0.07 to 4 parts by weight per 100 parts by weight of the aqueous dispersion copolymer, and in an adhesive layer made of an elongation at 90° C. resulted from the following test of the aqueous dispersion adhesive composition is 200% or less.

Test: An aqueous dispersion adhesive composition is heated to prepare an adhesive layer, and the adhesive layer thus prepared is formed into a cylindrical column shape having a cross section of 4.6 mm$^2$ and a length of 30 mm to prepare a test piece. Subsequently, the test piece is allowed to stand at 90° C. for 1 hour, and thereafter, an initial length $L_0$ of the test piece is measured. Then, the test piece with one end fixed and the other end attached a 12 g-weight, is hung down vertically at 90° C. for 2 hours. A length $L_1$ (mm) of the test piece after the 2-hour hanging is measured, and the elongation is calculated by the following equation:

$$\text{Elongation (\%)} = (L_1 - L_0)/L_0 \times 100$$

Further, in the aqueous dispersion adhesive composition of the present invention, it is preferable that the crosslinking agent is a compound having a carbodiimide group.

Further, in the aqueous dispersion adhesive composition of the present invention, it is preferable that the crosslinking agent is an oxazoline group-containing crosslinking agent and the amount of the crosslinking agent is from 0.07 to 1.5 parts by weight per 100 parts by weight of the aqueous dispersion copolymer.

Further, in the aqueous dispersion adhesive composition of the present invention, it is preferable that the aqueous dispersion adhesive composition has a gel fraction of from 80 to 95% by weight when being immersed in ethyl acetate.

Further, the adhesive film of the present invention comprises an adhesive layer made of an aqueous dispersion adhesive composition, the aqueous dispersion adhesive composition comprising an aqueous dispersion copolymer obtained by reacting of a reaction component comprising alkyl (meth)acrylate whose linear or branched alkyl group has 4 to 18 carbon atoms, (meth)acrylic acid, a phosphoric acid group-containing vinyl monomer and an alkoxysilyl group-containing vinyl monomer and a crosslinking agent having reactivity with a carboxyl group, wherein an amount of the crosslinking agent is from 0.07 to 4 parts by weight per 100 parts by weight of the aqueous dispersion copolymer, and an elongation at 90° C. based on the following test of the adhesive layer is 200% or less.

Test: An aqueous dispersion adhesive composition is heated to prepare an adhesive layer, and the adhesive layer thus prepared is formed into a cylindrical column shape having a cross section of 4.6 mm$^2$ and a length of 30 mm to prepare a test piece. Subsequently, the test piece is allowed to stand at 90° C. for 1 hour, and thereafter, an initial length $L_0$ of the test piece is measured. Then, the test piece with one end fixed and the other end attached a 12 g-weight, is hung down vertically at 90° C. for 2 hours. A length $L_1$ (mm) of the test piece after the 2-hour hanging is measured, and the elongation is calculated by the following equation:

$$\text{Elongation (\%)} = (L_1 - L_0)/L_0 - 100$$

Further, the adhesive film of the present invention, it is preferable that the crosslinking agent is a compound having a carbodiimide group.

Further, the adhesive film of the present invention, it is preferable that the crosslinking agent is an oxazoline group-containing crosslinking agent, and the amount of the crosslinking agent is from 0.07 to 1.5 parts by weight per 100 parts by weight of the aqueous dispersion copolymer.

The aqueous dispersion adhesive composition of the present invention and the adhesive film comprising an adhesive layer made of the aqueous dispersion adhesive composition show excellent adhesion with a substrate, thereby achieving firm adhesion. Further, since the aqueous dispersion adhesive composition and the adhesive film have excellent heat resistance and moisture resistance, excellent durability can be obtained under a high temperature and high humidity atmosphere.

In particular, the aqueous dispersion adhesive composition of the present invention, and the adhesive film comprising an adhesive layer made of the aqueous dispersion adhesive composition can effectively prevent the occurrence of air bubbles and distortions at high temperature and high humidity. Thus, the deterioration of optical characteristics can be prevented effectively.

DETAILED DESCRIPTION OF PREFERRED EMBODIMENTS

Figure 1:
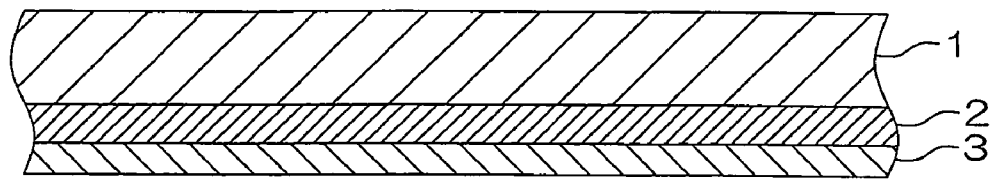
FIG. 1 is an enlarged sectional view of an adhesive optical film showing an embodiment of an adhesive film according to the present invention.

The aqueous dispersion adhesive composition of the present invention contains an aqueous dispersion copolymer and a crosslinking agent.

The aqueous dispersion copolymer is obtained by allowing a reaction component containing an alkyl (meth)acrylate, (meth)acrylic acid, a phosphoric acid group-containing vinyl monomer and an alkoxysilyl group-containing vinyl monomer to react.

The alkyl (meth)acrylate is an alkyl (meth)acrylate (an alkyl methacrylate and/or an alkyl acrylate) whose linear or branched alkyl group has 4 to 18 carbon atoms, and examples thereof include butyl (meth)acrylate, isobutyl (meth)acrylate, sec-butyl (meth)acrylate, t-butyl (meth)acrylate, pentyl (meth)acrylate, neopentyl (meth)acrylate, isoamyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate and octadecyl (meth)acrylate. Of these alkyl (meth)acrylates, butyl acrylate is preferable. These alkyl (meth)acrylates can be used alone or in combination.

The amount of the alkyl (meth)acrylate is, for example, from 60 to 99 parts by weight, preferably from 80 to 99 parts by weight, more preferably from 80 to 98 parts by weight, per 100 parts by weight of the reaction component.

Examples of the (meth)acrylic acid include methacrylic acid and acrylic acid.

The (meth)acrylic acid can be used alone or in combination. The amount of the (meth)acrylic acid is, for example, from 0.5 to 15 parts by weight, preferably from 0.5 to 10 parts by weight, more preferably from 1 to 10 parts by weight, per 100 parts by weight of the reaction component. When the amount is less than the above range, cohesive force of the aqueous dispersion adhesive composition may decrease. On the other hand, when the amount is more than the above range, stability upon emulsion polymerization and water resistance of the aqueous dispersion adhesive composition may deteriorate.

The phosphoric acid group-containing vinyl monomer is, for example, a polyalkylene oxide (meth)acrylate phosphate ester represented by the following general formula (1):

in the general formula (1), $R^1$ represents a hydrogen atom or a methyl group, $R^2$ represents a polyoxyalkylene group, and X represents a phosphoric acid group or a salt thereof.

The polyoxyalkylene group represented by $R^2$ is represented by the following general formula (2):

in the general formula (2), n represents an integer of 1 to 4, and m represents an integer of 2 or more.

Examples thereof include polyoxyethylene group (in the general formula (2), n=2), polyoxypropylene group (in the general formula (2), n=3) and a random, block, or graft unit thereof. The polymerization degree of these oxyalkylene groups, namely m in the general formula (2), is preferably 4 or more, and usually 40 or less.

When the polymerization degree of the oxyalkylene group is higher, mobility of a side chain having a phosphoric acid group increases, and interaction with glass rapidly proceeds, whereby adhesion of the aqueous dispersion adhesive composition to a glass substrate is improved.

The phosphoric acid group or a salt thereof represented by X is represented by the following general formula (3):

in the general formula (3), $M^1$ and $M^2$ each independently represents a hydrogen atom or a cation.

The cation is not particularly limited, and examples thereof include inorganic cations of alkali metals such as sodium and potassium, and alkaline earth metals such as calcium and magnesium; and organic cations of quaternary amines.

As the phosphoric acid group-containing vinyl monomer, commercially available products can be used, and examples thereof include mono[poly(ethylene oxide)methacrylate]

phosphate esters such as Sipomer PAM-100 (manufactured by Rhodia Nicca, Ltd.), Phosmer PE (manufactured by Uni-Chemical Co., Ltd.), Phosmer PEH (manufactured by Uni-Chemical Co., Ltd.) and Phosmer PEDM (manufactured by Uni-Chemical Co., Ltd.); and mono[poly(propylene oxide) methacrylate]phosphate esters such as Sipomer PAM-200 (manufactured by Rhodia Nicca, Ltd.), Phosmer PP (manufactured by Uni-Chemical Co., Ltd.), Phosmer PPH (manufactured by Uni-Chemical Co., Ltd.) and Phosmer PPDM (manufactured by Uni-Chemical Co., Ltd.).

These phosphoric acid group-containing vinyl monomers can be used alone or in combination.

The phosphoric acid group concentration of the phosphoric acid group-containing vinyl monomer in the reaction component is, for example, from 0.01 to 0.45 mmol/g, preferably from 0.02 to 0.20 mmol/g. To adjust the phosphoric acid group concentration of the phosphoric acid group-containing vinyl monomer within the above range, the amount of the phosphoric acid group-containing vinyl monomer is set from 0.5 to 20 parts by weight, preferably from 0.5 to 10 parts by weight, more preferably from 1 to 5 parts by weight, per 100 parts by weight of the reaction component, although it varies depending on the molecular weight of the phosphoric acid group-containing vinyl monomer.

When the phosphoric acid group concentration and the amount are less than the above ranges, the effect of improving adhesion to a glass substrate may not be fully achieved. When the phosphoric acid group concentration and the amount are more than the above ranges, the stability upon emulsion polymerization and the water resistance of the aqueous dispersion adhesive composition may deteriorate, and further adhesion may also be deteriorated due to increased elastic modulus of the aqueous dispersion adhesive composition.

Examples of the alkoxysilyl group-containing vinyl monomer include silicone (meth)acrylate monomer and silicone vinyl monomer.

Examples of the silicone (meth)acrylate monomer include (meth)acryloyloxyalkyl-trialkoxysilanes such as (meth)acryloyloxymethyl-trimethoxysilane, (meth)acryloyloxymethyl-triethoxysilane, 2-(meth)acryloyloxyethyl-trimethoxysilane, 2-(meth)acryloyloxyethyl-triethoxysilane, 3-(meth)acryloyloxypropyl-trimethoxysilane, 3-(meth)acryloyloxypropyl-triethoxysilane, 3-(meth)acryloyloxypropyl-tripropoxysilane, 3-(meth)acryloyloxypropyl-triisopropoxysilane and 3-(meth)acryloyloxypropyl-tributoxysilane; (meth)acryloyloxyalkyl-alkyldialkoxysilane such as (meth)acryloyloxymethyl-methyldimethoxysilane, (meth)acryloyloxymethyl-methyldiethoxysilane, 2-(meth)acryloyloxyethyl-methyldimethoxysilane, 2-(meth)acryloyloxyethyl-methyldiethoxysilane, 3-(meth)acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane and 3-(meth)acryloyloxypropyl-propyldiethoxysilane; and (meth)acryloyloxyalkyl-dialkyl(mono)alkoxysilanes corresponding to these monomers.

Examples of the silicone vinyl monomer include vinyltrialkoxysilanes such as vinyltrimetoxysilane, vinyltriethoxysilane, vinyltripropoxysilane, vinyltriisopropoxysilane and vinyltributoxysilane, and vinylalkyldialkoxysilane and vinyldialkylalkoxysilane corresponding to these monomers; vinylalkyltrialkoxysilane such as vinylmethyltrimetoxysilane, vinylmethyltriethoxysilane, β-vinylethyltrimethoxysilane, β-vinylethyltriethoxysilane, γ-vinylpropyltrimethoxysilane, γ-vinylpropyltriethoxysilane, γ-vinylpropyltripropoxysilane, γ-vinylpropyltriisopropoxysilane and γ-vinylpropyltributoxysilane, and (vinylalkyl)alkyldialkoxysilane and (vinylalkyl)dialkyl(mono)alkoxysilane corresponding to these monomers.

Of these alkoxysilyl group-containing vinyl monomers, silicone (meth)acrylate monomer is preferable, or 3-methacryloyloxypropyl-trimethoxysilane is more preferable.

These alkoxysilyl group-containing vinyl monomers can be used alone or in combination.

The amount of the alkoxysilyl group-containing vinyl monomer is, for example, from 0.001 to 1 part by weight, preferably from 0.01 to 0.1 parts by weight, per 100 parts by weight of the reaction component. When the amount is less than the above range, a cohesive force of the aqueous dispersion adhesive composition decreases and adhesion between the aqueous dispersion adhesive composition and the glass substrate cannot be improved because of poor crosslinking due to the alkoxysilyl group. When the amount is more than the above range, stability upon emulsion polymerization and adhesion may deteriorate.

The reaction component can further contain a copolymerizable vinyl monomer which is copolymerizable with the alkyl (meth)acrylate.

Examples of the copolymerizable vinyl monomer include (meth)acrylic acid alicyclic hydrocarbons whose alicyclic hydrocarbon group has 6 or more carbon atoms such as cyclohexyl (meth)acrylate, bornyl (meth)acrylate, isobornyl (meth)acrylate; aromatic vinyl monomers such as styrene; alkyl (meth)acrylates whose linear or branched alkyl group has 1 to 3 carbon atoms such as methyl (meth)acrylate, ethyl (meth)acrylate, propyl (meth)acrylate and isopropyl (meth)acrylate; aryl (meth)acrylates such as phenyl (meth)acrylate; alkoxy group-containing unsaturated monomers such as methoxyethyl (meth)acrylate and ethoxyethyl (meth)acrylate; olefin-based monomers such as ethylene, propylene, isoprene, butadiene and isobutylene; vinyl ether-based monomers such as vinyl ether; halogen atom-containing unsaturated monomers such as vinyl chloride; vinyl group-containing heterocyclic compounds such as N-vinyl pyrrolidone, N-(1-methylvinyl)pyrrolidone, N-vinylpyridine, N-vinyl piperidone, N-vinylpyrimidine, N-vinylpiperazine, N-vinylpyrazine, N-vinylpyrrole, N-vinylimidazole, N-vinyloxazole, N-vinylmorpholine and tetrahydrofurfuryl (meth)acrylate; and acrylate-based monomers containing a halogen atom such as fluorine atom, such as fluorine (meth)acrylate.

Examples of the copolymerizable vinyl monomer include functional group-containing vinyl monomer containing a functional group.

Examples of the functional group-containing vinyl monomer include carboxyl group-containing vinyl monomers, for example, unsaturated carboxylic acids such as fumaric acid, maleic acid, itaconic acid, crotonic acid and cinnamic acid, and unsaturated dicarboxylic acid anhydrides (except (meth)acrylic acid) such as itaconic anhydride, maleic anhydride and fumaric anhydride; vinyl carboxylate esters such as vinyl acetate and vinyl propionate; hydroxyl group-containing vinyl monomers such as 2-hydroxyethyl acrylate, 2-hydroxypropyl acrylate and 2-hydroxybutyl acrylate; amide group-containing unsaturated monomers such as (meth)acrylamide, N,N-dimethyl (meth)acrylamide, N,N-diethyl (meth)acrylamide, N-isopropyl (meth)acrylamide, N-butyl (meth)acrylamide, N-methoxymethyl (meth)acrylamide, N-methylol (meth)acrylamide, N-methylolpropane (meth)acrylamide and N-vinylcarboxylic acid amide; glycidyl group-containing unsaturated monomers such as glycidyl (meth)acrylate and methyl glycidyl (meth)acrylate; cyano group-containing unsaturated monomers such as acrylonitrile and methacrylonitrile; isocyanate group-containing unsaturated monomers such as 2-methacryloiloxyethyl isocyanate; sulfonic acid group-containing unsaturated monomers such as styrenesulfonic acid, allylsulfonic acid, 2-(meth)acrylamide-2-methylpropanesulfonic acid, (meth)acrylamidepropanesulfonic acid, sulfopropyl (meth)acrylate and (meth)acryloyloxynaphthalenesulfonic acid; maleimide-based monomers such as N-cyclohexylmaleimide, N-isopropylmaleimide, N-laurylmaleimide and N-phenylmaleimide; itaconimide-based monomers such as N-methylitaconimide, N-ethylitaconimide, N-butylitaconimide, N-octylitaconimide, N-2-ethylhexylitaconimide, N-cyclohexylitaconimide and N-laurylitaconimide; succinimide-based monomers such as N-(meth)acryloyloxymethylenesuccinimide, N-(meth)acryloyl-6-oxyhexamethylenesuccinimide and N-(meth)acryloyl-8-oxyoctamethylenesuccinimide; and glycol-based acryl ester monomers such as (meth)acrylic acid polyethylene glycol, (meth)acrylic acid polypropylene glycol, (meth)acrylic acid methoxyethylene glycol and (meth)acrylic acid methoxypolypropylene glycol.

Examples of the functional group-containing vinyl monomer mentioned above further include polyfunctional monomer.

Examples of the polyfunctional monomer include (mono or poly)alkylene glycol di(meth)acrylates, for example, (mono or poly)ethylene glycol di(meth)acrylates such as ethylene glycol di(meth)acrylate, diethylene glycol di(meth)acrylate, triethylene glycol di(meth)acrylate, trimethylolpropane tri(meth)acrylate and tetraethylene glycol di(meth)acrylate, and (mono or poly)propylene glycol di(meth)acrylates such as propylene glycol di(meth)acrylate; neopentyl glycol di(meth)acrylate, 1,6-hexandiol di(meth)acrylate, pentaerythritol di(meth)acrylate, trimethylolpropane tri(meth)acrylate, pentaerythritol tri(meth)acrylate, dipentaerythritol hexa(meth)acrylate and divinyl benzene. Examples of the polyfunctional monomer also include epoxy acrylate, polyester acrylate and urethane acrylate.

The copolymerizable vinyl monomers can be used alone or in combination.

Of these copolymerizable vinyl monomers, (meth)acrylic acid alicyclic hydrocarbon esters whose alicyclic hydrocarbon group has 6 or more carbon atoms are preferable, and cyclohexyl methacrylate is more preferable.

The copolymerizable vinyl monomer is optionally blended with the reaction component, and the amount thereof is, for example, 39 parts by weight or less, preferably 19 parts by weight or less, more preferably 18 parts by weight or less, per 100 parts by weight of the reaction component.

The blending of the copolymerizable vinyl monomers with the reaction component allows improvement in adhesion of the aqueous dispersion adhesive composition.

The aqueous dispersion copolymer is obtained by copolymerizing the above reaction component by a polymerization method such as emulsion polymerization.

In the emulsion polymerization, together with the above reaction component, polymerization initiators, emulsifiers, and if necessary, chain transfer agents are appropriately blended in water and then copolymerized. More specifically, a known emulsion polymerization method such as collective charging method (collective polymerization method), monomer dropping method and monomer emulsion dropping method can be employed. In the monomer dropping method, continuous dropping or divisional dropping is appropriately selected. Reaction conditions are appropriately selected, but the polymerization temperature is, for example, 20 to 100° C.

The polymerization initiator is not particularly limited, and a polymerization initiator, which is usually used in the emulsion polymerization, is used. Examples thereof include azo-based initiators such as 2,2'-azobisisobutyronitrile, 2,2'-azobis(2-methylpropioneamidine) disulfate, 2,2'-azobis(2-methylpropioneamidine) dihydrochloride, 2,2'-azobis(2-amidinopropane) dihydrochloride, 2,2'-azobis[N-(2-carboxyethyl)-2-methylpropioneamidine]hydrate, 2,2'-azobis(N,N'-dimethyleneisobutylamidine) and 2,2'-azobis[2-(2-imidazolin-2-yl)propane]dihydrochloride; persulfate-based initiators such as potassium persulfate and ammonium persulfate; peroxide-based initiators such as benzoyl peroxide, t-butyl hydroperoxide and hydrogen peroxide; substituted ethane-based initiators such as phenyl-substituted ethane; carbonyl-based initiators such as an aromatic carbonyl compound; and redox-based initiators such as combination of persulfate and sodium hydrogen sulfite and combination of peroxide and sodium ascorbate.

These polymerization initiators can be used alone or in combination.

Of these polymerization initiators, persulfate-based initiators are preferably used, and ammonium persulfate is more preferably used.

The amount of the polymerization initiator is appropriately selected and is, for example, from 0.001 to 1 part by weight per 100 parts by weight of the reaction component.

The dissolved oxygen concentration in the reaction component solution can be decreased by replacing the atmosphere with nitrogen before, while, or after blending the polymerization initiator with the above reaction component.

The emulsifier is not particularly limited and a known emulsifier, which is usually used in the emulsion polymerization, is used. Examples thereof include anionic emulsifiers such as sodium lauryl sulfate, ammonium lauryl sulfate, sodium dodecylbenzenesulfonate, polyoxyethylene sodium lauryl sulfate, sodium polyoxyethylene alkyl ether sulfate, ammonium polyoxyethylene alkyl phenyl ether sulfate, sodium polyoxyethylene alkyl phenyl ether sulfate and sodium polyoxyethylene alkyl sulfosuccinate; and nonionic emulsifiers such as polyoxyethylene alkyl ether, polyoxyethylene alkyl phenyl ether, polyoxyethylene fatty acid ester and polyoxyethylene polyoxypropylene block polymer.

The emulsifier further includes radical polymerizable (reactive) emulsifiers (e.g., HS-10 (manufactured by Dai-Ichi Kogyo Seiyaku Co., Ltd.)) in which a radical polymerizable functional group (reactive group) such as propenyl group or allyl ether group is introduced into the anionic emulsifier and the nonionic emulsifier.

These emulsifiers can be used alone or in combination. The amount of the emulsifier is, for example, 0.2 to 10 parts by weight, preferably 0.5 to 5 parts by weight, per 100 parts by weight of the reaction component.

The chain transfer agent may adjust a molecular weight of the aqueous dispersion copolymer as required, and a chain transfer agent, which is usually used in the emulsion polymerization, is used. Examples thereof include mercaptanes such as 1-dodecanethiol, mercaptoacetic acid, 2-mercaptoethanol, 2-ethyl hexyl thioglycolate and 2,3-dimethylcapto-1-propanol.

These chain transfer agents can be used alone or in combination. The amount of the chain transfer agent is, for example, from 0.001 to 0.5 parts by weight per 100 parts by weight of the reaction component.

The aqueous dispersion copolymer resulted from such emulsion polymerization can be prepared as an emulsion (aqueous dispersion).

The aqueous dispersion copolymer can also be prepared by polymerizing the above reaction component through a method without using an organic solvent other than the emulsion polymerization method, and then dispersing the resulting polymer in water using the above emulsifier.

For the purpose of improving stability of the emulsion, a pH of the aqueous dispersion copolymer is adjusted from 7 to 9, preferably from 7 to 8, by aqueous ammonia or the like.

The aqueous dispersion adhesive composition of the present invention is obtained by mixing the aqueous dispersion copolymer thus obtained above and the crosslinking agent.

The crosslinking agent is a crosslinking agent having reactivity with a carboxyl group (a carboxyl group of mainly (meth)acrylic acid), and examples thereof include carbodiimide crosslinking agent, isocyanate crosslinking agent, epoxy crosslinking agent, oxazoline crosslinking agent, aziridine crosslinking agent and metal chelate crosslinking agent. As the crosslinking agent, carbodiimide crosslinking agent and oxazoline crosslinking agent are preferable.

For example, an oil-soluble or water-soluble crosslinking agent may be used, or a crosslinking agent prepared as an aqueous dispersion type (emulsion type) may also be used. As a crosslinking agent (specifically, an oxazoline crosslinking agent), preferably a crosslinking agent of an aqueous dispersion, or more preferably a carbodiimide crosslinking agent of an aqueous dispersion may be used.

When the carbodiimide crosslinking agent of an aqueous dispersion is used as a crosslinking agent having reactivity with a carboxyl group of an aqueous dispersion copolymer, the aqueous dispersion adhesive composition is less susceptible to change in liquid properties, specifically, viscosity, after blending of the crosslinking agent, thereby facilitating handling of the aqueous dispersion adhesive composition in the manufacturing process.

The carbodiimide crosslinking agent is a compound having a carbodiimide group. The carbodiimide group is a functional group (—N=C=NH) in which one hydrogen atom is abstracted from carbodiimide (HN=C=NH), or a functional group (—N=C=N—) in which two hydrogen atoms are abstracted therefrom. The carbodiimide group can react with a carboxyl group.

More specifically, examples of the carbodiimide crosslinking agent include low molecular weight compound or high molecular weight compound each having two or more carbodiimide groups.

The low molecular weight compound having a carbodiimide group is represented by the following general formula:

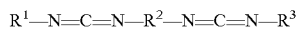

wherein $R^1$, $R^2$ and $R^3$ are different from each other, and each represents a hydrocarbon group.

The high molecular weight compound having a carbodiimide group may be polycarbodiimide, and a high molecular weight compound having a site excellent in affinity for water such as an ethyleneoxide (—CH$_2$—CH$_2$—O—) site is preferable.

As the high molecular weight compound having the above carbodiimide group, commercially available products can be used, and examples thereof include water-soluble CARBODILITE V series (under the trade names of CARBODILITE V-02, CARBODILITE V-02-L2 and CARBODILITE V-04, hereinabove manufactured by NISSHINBO INDUSTRIES, INC.); and emulsion type (aqueous dispersion) CARBODILITE E series (under the trade names of CARBODILITE E-01, CARBODILITE E-02 and CARBODILITE E-04, hereinabove manufactured by NISSHINBO INDUSTRIES, INC.).

These carbodiimide crosslinking agents can be used alone or in combination.

Of these carbodiimide crosslinking agents, high molecular weight compound having a carbodiimide group is preferable.

The oxazoline crosslinking agent is a crosslinking agent having an oxazoline group, and examples thereof include those having a main chain being of an acryl skeleton or a styrene skeleton and having an oxazoline group in a side chain of the main chain, and preferably an oxazoline group-containing acrylic polymer having a main chain being of an acryl skeleton and having an oxazoline group in a side chain of the main chain.

Examples of the oxazoline group include 2-oxazoline group, 3-oxazoline group and 4-oxazoline group, and a 2-oxazoline group is preferable.

The 2-oxazoline group is generally represented by the following general formula (4):

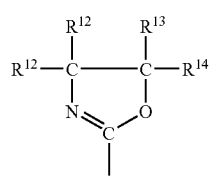

(4)

in the general formula (4), $R^{12}$, $R^{13}$, $R^{14}$ and $R^{15}$ each independently represents a hydrogen atom, a halogen atom, an alkyl group, an aralkyl group, a phenyl group, or a substituted phenyl group.

The oxazoline group-containing polymer can be used as an emulsion type which is emulsified in water using an emulsifier or a water solution type which is dissolved in water.

As the oxazoline group-containing polymer, commercially available products are usually used, and specific examples thereof include, as a water-soluble type, oxazoline group-containing acrylic polymers such as EPOCROS WS-500 (solid content: 40%, main chain: acrylic, pH 7 to 9, oxazoline value: 220 g solid/eq., manufactured by NIPPON SHOKUBAI Co., Ltd.) and EPOCROS WS-700 (solid content: 25%, main chain: acrylic, pH 7 to 9, oxazoline value: 220 g solid/eq., manufactured by NIPPON SHOKUBAI Co., Ltd.); and, as an emulsion type, oxazoline group-containing acryl/styrene polymers such as EPOCROS K-1000 series (solid content: 40%, main chain: styrene/acrylic, oxazoline value: 1100 g solid/eq., pH 7 to 9, manufactured by NIPPON SHOKUBAI Co., Ltd.) and EPOCROS K-2000 series (solid content: 40%, main chain: styrene/acrylic, pH 7 to 9, oxazoline value: 550 g solid/eq., manufactured by NIPPON SHOKUBAI Co., Ltd.).

These oxazoline crosslinking agents can be used alone or in combination of two or more kinds.

When the oxazoline crosslinking agent is contained in the aqueous dispersion adhesive composition, an oxazoline group therein mainly reacts with a functional group (mainly a carboxyl group of (meth)acrylic acid) at relatively low temperatures, so that a firm adhesive layer can be formed.

The amount of the crosslinking agent (carbodiimide crosslinking agent) is from 0.07 to 4 parts by weight, preferably from 0.08 to 3 parts by weight, more preferably from 0.1 to 2 parts by weight, per 100 parts by weight of the aqueous dispersion copolymer (i.e., solid content of the aqueous dispersion). Further, when the crosslinking agent is an oxazoline crosslinking agent, the amount thereof is, for example, from 0.07 to 1.5 parts by weight, preferably from 0.1 to 1 parts by weight, more preferably from 0.1 to 0.3 parts by weight, per 100 parts by weight of the aqueous dispersion copolymer (i.e., solid content of the aqueous dispersion).

When the amount is less than the above range, foaming of the adhesive layer under a high temperature atmosphere cannot be suppressed. On the other hand, when the amount is more than the above range, the adhesion (tackiness) of the aqueous dispersion adhesive composition, particularly the adhesion to a glass substrate during heating and humidifying may decrease. The adhesion (90° peel adhesion: peel rate [10 mm/min]) during heating and humidifying is desirably 2.0 N/25 mm or more.

The aqueous dispersion copolymer is crosslinked by mixing the aqueous dispersion copolymer and the crosslinking agent. More specifically, when the crosslinking agent is a carbodiimide crosslinking agent, the aqueous dispersion copolymer is crosslinked by allowing carboxyl groups of the aqueous dispersion copolymer to react with carbodiimide groups of the carbodiimide crosslinking agent. When the crosslinking agent is an oxazoline crosslinking agent, the aqueous dispersion copolymer is crosslinked by allowing carboxyl groups of the aqueous dispersion copolymer to react with oxazoline groups of the oxazoline crosslinking agent.

In order to accelerate the crosslinking reaction, after the aqueous dispersion copolymer and the crosslinking agent are mixed, the mixed mixture can be heated, for example, at a temperature of from 80 to 150° C., or preferably from 80 to 120° C., for 1 to 10 minutes. As such heat, heat for drying during formation of the adhesive layer described later may be utilized.

Further, additives, which are usually added to an aqueous dispersion adhesive composition, such as viscosity modifiers, release modifiers, plasticizers, softening agents, fillers, colorant (such as pigments and dyes), antioxidant and surfactant, if necessary, may be appropriately added to the aqueous dispersion adhesive composition thus obtained. The amount of these additives is not particularly limited and can be appropriately selected.

The gel fraction of the aqueous dispersion adhesive composition (solid content) thus prepared is, for example, from 80 to 95% by weight, preferably from 80 to 93% by weight. When the gel fraction is less than the above range, foaming may occur in the case where the aqueous dispersion adhesive composition is applied to the adhesive optical film and the resulting product is used under a high temperature atmosphere. On the other hand, when the gel fraction is more than the above range, the adhesion of the aqueous dispersion adhesive composition may decrease.

After the aqueous dispersion adhesive composition is coated with a Teflon sheet (registered trademark) and then immersed in ethyl acetate for 7 days, the gel fraction can be calculated by the following equation:

Gel Fraction (% by weight)=(Weight of Aqueous Dispersion Adhesive Composition Adhering to Teflon Sheet (registered trademark) After Immersion/Weight of Aqueous Dispersion Adhesive Composition Before Immersion)×100

A method for producing the adhesive optical film as an embodiment of an adhesive film according to the present invention, will be described below with reference to FIG. 1.

First, an optical film 1 is prepared so as to obtain a pressure-sensitive adhesive optical film.

The optical film 1 is not particularly limited as long as it is a film which has optical characteristics and is bonded to a liquid crystal display or the like, and examples thereof include polarizing film, phase difference film, luminance improving film and view-angle expansion film.

As the polarizing film, those having a transparent protective film provided on one side or both sides of the polarizer are used.

The polarizer is not particularly limited, and examples thereof include those obtained by dyeing hydrophilic polymer films such as polyvinyl alcohol-based film, partially formulated polyvinyl alcohol film and ethylene-vinyl acetate copolymer partially saponified film with a dichroic substance such as iodine or dichroic dye, and then uniaxially stretching the dyed film; and polyene oriented films subjected to a dehydration treatment of polyvinyl alcohol or a dehydrochlorination treatment of polyvinyl chloride. A polarizer obtained by dyeing a polyvinyl alcohol film with iodine and then uniaxially stretching the dyed film is preferable.

Examples of the transparent protective film include polyester polymer film such as polyethylene terephthalate or polyethylene naphthalate, cellulose polymer film such as diacetyl cellulose or triacetyl cellulose, acrylic polymer film such as polymethyl methacrylate, styrene polymer film such as polystyrene or acrylonitrile-styrene copolymer (AS resin) and polycarbonate polymer film. The transparent protective film further includes polyolefin polymer film such as polyethylene, polypropylene, polyolefin having a cyclo or norbornene structure or ethylene-propylene copolymer, vinyl chloride polymer film, nylon, amide polymer film such as aromatic polyamide, imide polymer film, sulfone polymer film, polyethersulfone polymer film, polyether ether ketone polymer film, polyphenylene sulfide polymer film, vinyl alcohol-based polymer film, vinylidene chloride polymer film, vinyl butyral polymer film, allylate polymer film, polyoxymethylene polymer film, epoxy polymer film, or films such as a blend of the above polymers.

The transparent protective film can be formed as a cured layer made of an acrylic-based, urethane-based, acryl-urethane-based, epoxy or silicone thermosetting or ultraviolet curable resin.

The transparent protective film is preferably made of a cellulose polymer. The thickness of the transparent protective film is not particularly limited and is, for example, 500 μm or less, preferably from 1 to 300 μm, more preferably from 5 to 200 μm.

The polarizer is bonded with the transparent protective film using an isocyanate adhesive, a polyvinyl alcohol adhesive, a gelatin adhesive, a vinyl adhesive, a latex adhesive or water polyester adhesive.

Examples of the phase difference film include double refraction film obtained by uniaxially or biaxially stretching a polymer material, oriented film of a liquid crystal polymer, and film comprising an oriented layer made of a liquid crystal polymer supported thereon. The thickness of the phase difference film is not particularly limited and is, for example, from 20 to 150 μm.

Examples of the polymer material include polyvinyl alcohol, polyvinyl butyral, polymethyl vinyl ether, polyhydroxyethyl acrylate, hydroxyethyl cellulose, hydroxypropyl cellulose, methyl cellulose, polycarbonate, polyarylate, polysulfone, polyethylene terephthalate, polyethylene naphthalate, polyether sulfone, polyphenylene sulfide, polyphenylene oxide, polyallyl sulfone, polyvinyl alcohol, polyamide, polyimide, polyolefin, polyvinyl chloride, cellulose-based polymer, or various two-dimensional or three-dimensional copolymers thereof, graft copolymer and blends.

These polymer materials are formed into an oriented substance (stretched film) by stretching.

Examples of the liquid crystal polymer include various main chain or side chain type liquid crystal polymers in which a conjugated linear atomic group (mesogen) capable of imparting liquid crystal orientation is introduced into the main chain or side chain of the polymer. The main chain type liquid crystal polymer has a structure in which a mesogenic group is attached at the spacer moiety capable of imparting flexibility, and specific examples thereof include nematically oriented polyester-based liquid crystal polymer, discotic polymer and cholesteric polymer. Examples of the side chain type liquid crystal polymer include those which contain polysiloxane, polyacrylate, polymethacrylate or polymalonate as a main chain skeleton and also have, as a side chain, a mesogenic moiety composed of a para-substituted cyclic compound unit capable of imparting nematic orientation via a spacer moiety composed of a conjugated atomic group. These liquid crystal polymers are obtained by spreading a solution of a liquid crystal polymer over an oriented surface such as the surface of a thin film made of polyimide or polyvinyl alcohol formed on a glass plate subjected to a rubbing treatment, or to an oblique deposition with silicon oxide, and then conducting heat treatment.

The phase difference film may be one used for the purpose of coloring of films having various wavelengths and a liquid crystal layer due to double refraction or of enlarging a view angle, or one appropriately having phase difference according to the purpose of use, or optical characteristics such as phase difference may be controlled by laminating two or more phase difference films.

Examples of the luminance improving film include those which allow permeation of linear polarization of a predetermined polarizing axis and reflect other light, such as multi-layered thin film of dielectrics or multilayered laminate composed of thin films each having different refractive index anisotropy; and those which allow permeation of either left-hand or right-hand circularly polarized light and reflects the other light, such as oriented film of a cholesteric liquid crystal polymer or a film having an oriented liquid crystal layer supported on the base material.

The view-angle expansion film is a film used to enlarge a view angle so that images can be seen relatively clearly when the image plane of the liquid crystal display is viewed from a slightly diagonal direction relative to the image plane, not from a perpendicular direction to the image plane, and examples thereof include phase difference film, oriented film made of liquid crystal polymer, and film having an oriented layer such as a liquid crystal polymer supported by a transparent base material. Examples of the phase difference film used as the view-angle expansion film include polymer film having double refraction obtained by biaxially stretched in the plane direction; polymer film having double refraction, in which refractive index in the thickness direction is controlled, obtained by uniaxially stretching in the plane direction and also under stretch in the thickness direction, and biaxially stretched film such as inclined oriented film.

An adhesive layer 2 made of the aqueous dispersion adhesive composition is provided on one side of the optical film 1.

The adhesive layer 2 is provided, for example, by transferring the adhesive layer 2 to the above-mentioned optical film 1 from a release sheet 3 on which the adhesive layer 2 is formed. The release sheet 3 on which the adhesive layer 2 is formed is produced by directly coating the aqueous dispersion adhesive composition on the release sheet 3 using a known coating method such as knife coating method. Thereafter, the adhesive layer 2 is provided on the release sheet 3, for example, by heating to dry the release sheet 3 thus coated at a temperature of from 80 to 150° C. for 1 to 10 minutes. To transfer the adhesive layer 2, the release sheet 3 on which the adhesive layer 2 is formed is laminated with the optical film 1 and then the release sheet 3 is removed from the adhesive layer 2.

The adhesive layer 2 can also be formed, for example, by directly coating the aqueous dispersion adhesive composition onto the optical film 1 using a known coating method such as knife coating method, and then heating to dry the release sheet 3 thus coated at a temperature of from 80 to 150° C. for 1 to 10 minutes.

Figure 2:
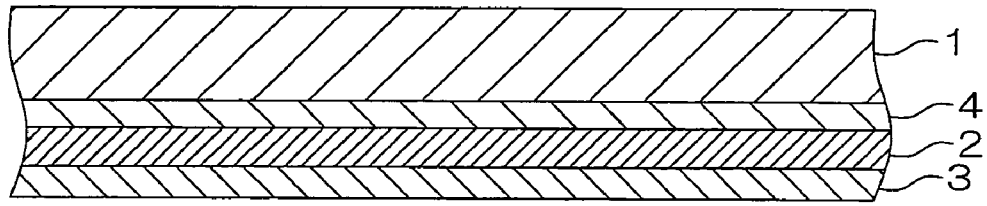
FIG. 2 is an enlarged sectional view of an adhesive optical film showing another embodiment of an adhesive film according to the present invention.

As shown in FIG. 2, the optical film 1 can be previously subjected to undercoating treatment such as appropriately provided with an under coat layer 4 in order to improve adhesion (anchoring force) with the adhesive layer 2.

The under coat layer 4 contains, for example, resin, and examples of the resin include polyacrylic resin, polyurethane resin and polyester resin, and resin obtained by modifying these resins with a reactive functional group is preferable.

Examples of the reactive functional group include oxazoline group, carboxyl group, hydroxyl group and amino group, and oxazoline group is preferable.

Examples of the oxazoline group include the same group as those described above.

Examples of the resin modified with a reactive functional group include, when the reactive functional group is oxazoline group, oxazoline group-containing resin which has a main chain being of an acryl skeleton or a styrene skeleton and has an oxazoline group in a side chain of the main chain, and the same oxazoline group-containing acrylic polymer as described above is preferable.

The number average molecular weight of the oxazoline group-containing acrylic polymer is, for example, 5000 or more, preferably or more, and usually 1000000 or less. When the number average molecular weight is lower than 5000, cohesive failure occurs because of poor strength of the under coat layer, whereby an anchoring force may not be improved. When the number average molecular weight is higher than 1000000, workability may be inferior. The oxazoline value of the oxazoline group-containing acrylic polymer is, for example, 1500 g solid/eq. or less, preferably 1200 g solid/eq. When the oxazoline value is larger than 1500 g solid/eq., the amount of the oxazoline group contained in a molecule decreases, whereby the anchoring force may not be improved.

These resins are used alone or in combination. The resin is usually prepared by dissolving or dispersing the resin in an organic solvent, water, or the like so that the amount of the solid content thereof may be from 0.01 to 15% by weight, preferably from 0.05 to 5% by weight.

The under coat layer 4 is provided, for example, by a method of directly applying an undercoat (solution or dispersion) containing a resin to the optical film 1 using a known coating method such as coating method, dipping method and spraying method, and then drying the coating.

The thickness of the under coat layer 4 is set so that the thickness before drying is, for example, from 1 to 500 µm, preferably from 10 to 100 µm and more preferably from 20 to 50 µm, and so that the thickness after drying is, for example, from 1 to 1000 nm, preferably from 10 to 500 nm and more preferably from 20 to 400 nm.

Examples of the release sheet 3 include synthetic resin film made of paper, polyethylene, polypropylene or polyethylene terephthalate; rubber sheet; fabric; nonwoven fabric; net; foamed sheet; metal foil; and laminated sheet material thereof. If necessary, the surface of the release sheet 3 may be subjected to a treatment (release treatment) such as silicone treatment, long chain alkyl treatment or fluorine treatment so as to enhance releasability from the adhesive layer 2.

The thickness (thickness after drying) of the adhesive layer 2 is set within a range, for example, from 1 to 100 μm, preferably from 5 to 50 μm and more preferably from 10 to 30 μm.

The elongation at 90° C. resulted from the following test of the adhesive layer 2 made of the above aqueous dispersion adhesive composition is 200% or less, preferably 180% or less, more preferably 150% or less, even more preferably 100% or less, even more preferably 50% or less, and usually 0% or more.

Elongation test at 90° C.: An aqueous dispersion adhesive composition is heated to prepare an adhesive layer, and the adhesive layer thus prepared is formed into a cylindrical column shape having a cross section of 4.6 mm$^2$ and a length of 30 mm to prepare a test piece. Subsequently, the test piece is allowed to stand at 90° C. for 1 hour, and thereafter, an initial length $L_0$ of the test piece is measured. Then, the test piece with one end fixed and the other end attached a 12 g-weight, is hung down vertically at 90° C. for 2 hours. A length $L_1$ (mm) of the test piece after the 2-hour hanging is measured, and the elongation is calculated by the following equation:

Elongation (%)=$(L_1-L_0)/L_0 \times 100$

When the elongation at 90° C. exceeds the above range, the foaming resistance of the adhesive layer 2 under a high temperature atmosphere decreases, and thus foaming cannot be suppressed.

The elongation of the adhesive layer 2 at 23° C. is, for example, 150% or less, preferably 130% or less, more preferably 100% or less, even more preferably 80% or less, even more preferably 50% or less, and usually 0% or more.

The elongation at 23° C. can be calculated in the same manner as the elongation test at 90° C. described above except that the temperature is changed from 90° C. to 23° C. in the elongation test at 90° C.

An adhesive optical film can thus be obtained by providing the adhesive layer 2 made of the aqueous dispersion adhesive composition on one side of the optical film 1.

The adhesive optical film thus obtained is preferably used in various industrial applications as adhesive optical films such as polarizing film, phase difference film, luminance improving film and view-angle expansion film.

The aqueous dispersion adhesive composition of the present invention has excellent adhesion even when sticking to a glass substrate, which allows the adhesive optical film to firmly stick to a glass substrate.

Further, since the adhesive optical film has excellent heat resistance and moisture resistance, excellent durability can be obtained even in a high temperature and high humidity atmosphere.

In particular, the aqueous dispersion adhesive composition of the present invention and the adhesive optical film comprising an adhesive layer made of the aqueous dispersion adhesive composition can effectively prevent the occurrence of air bubbles and distortions at high temperature and high humidity. Thus, the deterioration of optical characteristics can be prevented effectively.

In the above description, the adhesive film of the present invention has been illustrated and described with the adhesive optical film. However, the adhesive film of the present invention can be used as an adhesive film adhered to an adherend other than the optical film. The adhesive film of the present invention is also used, for example, as adhesive sheet, adhesive tape, or the like.

In the above description, the adhesive layer 2 and, if necessary, the under coat layer 4 provided are provided on one side of the optical film 1. However, these layers can also be provided on both sides of the optical film 1.

In the usual aqueous dispersion adhesive composition, a tackifying resin such as rosin-based resin or elastomer is added so as to enhance adhesion to an adherend. However, since the aqueous dispersion adhesive composition of the present invention can enhance adhesion without adding the tackifying resin, regardless of aqueous dispersibility, it is possible to obtain an aqueous dispersion adhesive composition having high adhesion at low cost, and an adhesive film comprising an adhesive layer made of the aqueous dispersion adhesive composition.

EXAMPLES

The present invention will now be described in more detail by way of Examples and Comparative Examples. However, the present invention is not limited to the following Examples and Comparative Examples. In the following description, the units "part(s)" and "%" are by weight, unless otherwise noted.

Example 1

Preparation of Monomer Preemulsion

In a vessel, 92 parts of butyl acrylate, 6 parts of methacrylic acid, 2 parts of mono[poly(propylene oxide)methacrylate] phosphate ester (average degree of polymerization of propylene oxide: about 5.0) and 0.03 parts of 3-methacryloyloxypropyl-trimethoxysilane (KBM-503, manufactured by SHIN-ETSU CHEMICAL CO., LTD.) were charged and mixed to prepare a mixture of the reaction components. Subsequently, to 388 g of the mixture of the reaction components thus prepared, 46.6 g of a reactive emulsifier AQUALON HS-10 (Dai-Ichi Kogyo Seiyaku Co., Ltd.) and 346 g of ion-exchange water were added, and the mixture was forcibly emulsified with stirring at 5000 (1/min) for 5 minutes using a homogenizer (manufactured by Tokusyu Kika Kogyo Co., Ltd.) to prepare a monomer preemulsion.

Preparation of Emulsion of Aqueous Dispersion Copolymer

In a reaction vessel equipped with a condenser tube, a nitrogen introducing tube, a thermometer and a stirrer, 156 g of the resulting monomer preemulsion and 219 g of ion-exchange water were charged, and subsequently, the atmosphere in the reaction vessel was replaced by nitrogen. Thereafter, 0.023 g of ammonium persulfate (0.03 parts per 100 parts of the solid content of the charged monomer preemulsion) was added thereto, and the added mixture was polymerized at 65° C. for 2.5 hours. Then, 0.217 g of ammonium persulfate (0.07 parts per 100 parts of the solid content of the residual monomer preemulsion) was added to 625 g of the residual monomer preemulsion. The resulting mixture was added dropwise in the reaction vessel over 3 hours, and thereafter, polymerization was conducted at 70° C. for 3 hours while the atmosphere was replaced with nitrogen, to obtain an emulsion (aqueous dispersion) of an aqueous dispersion copolymer having a solid content of 40%.

Preparation of Aqueous Dispersion Adhesive Composition

After the emulsion thus obtained was cooled to room temperature, the pH was adjusted to 8 by adding 10% aqueous ammonia, and 0.1 parts of carbodiimide crosslinking agent (CARBODILITE V-04, water-soluble type, manufactured by NISSHINBO INDUSTRIES, INC.) was further added to 100 parts of the solid content of the emulsion (aqueous dispersion copolymer) to prepare an aqueous dispersion adhesive composition.

Production of Adhesive Optical Film

The aqueous dispersion adhesive composition thus prepared was coated onto a release sheet made of polyester film which was treated with a release agent, and the coating was heated to dry at 100° C. for 2 minutes to form a 23 μm-thick adhesive layer.

A polarizing film previously subjected to an undercoating treatment was prepared. For the undercoating treatment, an undercoating solution was first prepared by diluting an oxazoline group-containing acrylic polymer (EPOCROS WS-700, manufactured by NIPPON SHOKUBAI Co., Ltd.) with a mixed solvent of water and ethanol (weight ratio: 1:1) so as to adjust the solid content to 0.25% by weight. Then, the undercoating solution was applied onto one side of the polarizing film using a wire bar #5, and the applied coating was heated to dry at 40° C. for 2 minutes to prepare an under coat layer.

The above polarizing film was produced by stretching a polyvinyl alcohol film in an aqueous iodine solution, drying the polyvinyl alcohol film, and thereafter, bonding a triacetyl cellulose film as a transparent protective film to both sides of the polarizer.

Subsequently, the polarizing film was laminated on a phase difference film (NAZ-#195-0.3, manufactured by Nitto Denko Corporation) so that a surface which is not provided with the under coat layer and the phase difference film are stuck to each other. Thus, an optical film on which the polarizing film provided with the under coat layer, and the phase difference film were laminated was produced.

Then, the adhesive layer was laminated on the under coat layer of the optical film to produce an adhesive optical film (cf. FIG. 2).

Example 2

In the same manner as in Example 1, except that 0.3 parts of the carbodiimide crosslinking agent (CARBODILITE V-04) was added in place of 0.1 parts of the carbodiimide crosslinking agent (CARBODILITE V-04) in the preparation of the aqueous dispersion adhesive composition in Example 1, an aqueous dispersion adhesive composition was prepared and an adhesive optical film was then produced.

Example 3

Preparation of Monomer Preemulsion

In a vessel, 88 parts of butyl acrylate, 5 parts of acrylic acid, 5 parts of cyclohexyl methacrylate, 2 parts of mono[poly (propylene oxide)methacrylate]phosphate ester (average polymerization degree of propylene oxide: about 5.0) and 0.03 parts of 3-methacryloyloxypropyl-trimethoxysilane (KBM-503, manufactured by SHIN-ETSU CHEMICAL CO., LTD.) were charged and mixed to prepare a mixture of the reaction components. Subsequently, to 388 g of the mixture of the reaction components thus prepared, 46.6 g of a reactive emulsifier AQUALON HS-10 (Dai-Ichi Kogyo Seiyaku Co., Ltd.) and 346 g of ion-exchange water were added, and the mixture was forcibly emulsified with stirring at 5000 (1/min) for 5 minutes using a homogenizer (manufactured by Tokusyu Kika Kogyo Co., Ltd.) to prepare a monomer preemulsion.

Preparation of Emulsion of Aqueous Dispersion Copolymer

In a reaction vessel equipped with a condenser tube, a nitrogen introducing tube, a thermometer and a stirrer, 78 g of the resulting monomer preemulsion and 219 g of ion-exchange water were charged, and subsequently, the atmosphere in the reaction vessel was replaced by nitrogen. Thereafter, 0.004 g of ammonium persulfate (0.01 parts per 100 parts of the solid content of the charged monomer preemulsion) was added thereto, and the added mixture was polymerized at 65° C. for 2.5 hours. Then, 0.244 g of ammonium persulfate (0.07 parts per 100 parts of the solid content of the residual monomer preemulsion) was added to 702.5 g of the residual monomer preemulsion. The resulting mixture was added dropwise in the reaction vessel over 3 hours, and thereafter, polymerization was conducted at 75° C. for 3 hours while the atmosphere was replaced with nitrogen, to obtain an emulsion (aqueous dispersion) of an aqueous dispersion copolymer having a solid content of 40%.

Preparation of Aqueous Dispersion Adhesive Composition

After the emulsion thus obtained was cooled to room temperature, the pH was adjusted to 8 by adding 10% aqueous ammonia, and 0.5 parts of a carbodiimide crosslinking agent (CARBODILITE V-04) was further added to 100 parts of the solid content of the emulsion (aqueous dispersion copolymer) to prepare an aqueous dispersion adhesive composition.

Production of Adhesive Optical Film

The aqueous dispersion adhesive composition thus prepared was coated onto a release sheet made of polyester film which was treated with a release agent, and the coating was subjected to heat treatment at 100° C. for 2 minutes to form a 23 μm-thick adhesive layer.

Then, the adhesive layer was laminated on the under coat layer of the same optical film as in Example 1 to produce an adhesive optical film (cf. FIG. 2).

Example 4

In the same manner as in Example 3, except that 1 part of the carbodiimide crosslinking agent (CARBODILITE V-04) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Example 5

In the same manner as in Example 3, except that 0.175 g (0.05 parts per 100 parts of the solid content of the residual monomer preemulsion) of ammonium persulfate was added in place of 0.244 g (0.07 parts per 100 parts of the solid content of the residual monomer preemulsion) of ammonium persulfate in the dropping polymerization in preparation of the emulsion of the aqueous dispersion copolymer in Example 3, an emulsion (aqueous dispersion) of an aqueous dispersion copolymer was prepared, and an aqueous dispersion adhesive composition was then prepared, followed by production of an adhesive optical film.

Example 6

In the same manner as in Example 3, except that 1 part of the carbodiimide crosslinking agent (CARBODILITE V-04) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Example 7

In the same manner as in Example 3, except that 2 parts of the carbodiimide crosslinking agent (CARBODILITE V-04) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Example 8

In the same manner as in Example 3, except that 3 parts of the carbodiimide crosslinking agent (CARBODILITE V-04) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Example 9

In the same manner as in Example 3, except that 1 part of the carbodiimide crosslinking agent (CARBODILITE E-04, emulsion type, manufactured by NISSHINBO INDUSTRIES, INC.) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Example 10

In the same manner as in Example 3, except that 0.5 parts of the carbodiimide crosslinking agent (CARBODILITE E-04, emulsion type, manufactured by NISSHINBO INDUSTRIES, INC.) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Example 11

In the same manner as in Example 3, except that 2 parts of the carbodiimide crosslinking agent (CARBODILITE E-04, emulsion type, manufactured by NISSHINBO INDUSTRIES, INC.) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Comparative Example 1

In the same manner as in Example 1, except that the carbodiimide crosslinking agent was not added in the preparation of the aqueous dispersion adhesive composition in Example 1, an aqueous dispersion adhesive composition was prepared and an adhesive optical film was produced.

Comparative Example 2

In the same manner as in Example 3, except that the carbodiimide crosslinking agent was not added in the preparation of the aqueous dispersion adhesive composition in Example 3, an aqueous dispersion adhesive composition was prepared and an adhesive optical film was produced.

Comparative Example 3

In the same manner as in Example 3, except that 0.0005 parts of the carbodiimide crosslinking agent (CARBODILITE V-04) was added in place of 0.1 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Comparative Example 4

In the same manner as in Example 3, except that 0.001 parts of the carbodiimide crosslinking agent (CARBODILITE V-04) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Comparative Example 6

In the same manner as in Example 3, except that 0.05 parts of the carbodiimide crosslinking agent (CARBODILITE V-04) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Comparative Example 6

In the same manner as in Example 3, except that 5 parts of the carbodiimide crosslinking agent (CARBODILITE V-04) was added in place of 0.5 parts of the carbodiimide crosslinking agent (CARBODILITE V-04) in the preparation of the aqueous dispersion adhesive composition in Example 3, an aqueous dispersion adhesive composition was prepared and an adhesive optical film was then produced.

Evaluation

1) Elongation of Adhesive Layer

Each of the aqueous dispersion adhesive composition in Examples 1 to 11 and Comparative Examples 1 to 6 was heated at 100° C. for 2 minutes to prepare a 23 µm-thick adhesive layer. The adhesive layer was cooled and was thereafter formed into a 200 mm×30 mm rectangle sheet-like shape in plan view using a spatula. Subsequently, the sheet-shaped adhesive layer was formed into a cylindrical column shape having a cross section of 4.6 mm² and a length of 30 mm by winding the layer by hand, to prepare a test piece. A 10 mm-portion at each end of the test piece in the lengthwise direction was then clipped. The test piece thus clipped was allowed to stand for 1 hour under an atmosphere at 23° C. (room temperature) and an atmosphere at 90° C., and the test piece was aged.

The length (initial length) $L_0$ (mm) in the middle of the lengthwise direction over which the test piece was not clipped was previously measured with a ruler. Subsequently, the clip at one end of the test piece was fixed and a 12 g weight was attached to the clip at the other end of the test piece. Then, the test piece was vertically hung down under an atmosphere at 23° C. (room temperature) and an atmosphere at 90° C. for 2 hours. After the 2-hour hanging, the length $L_1$ (mm) in the middle of the lengthwise direction over which the test piece was not fixed with the clip was measured with a ruler. The initial length $L_0$ was about 10 mm.

Each of the elongation after 2 hours at 23° C. and the elongation after 2 hours at 90° C. was calculated by the following equation. The results are shown in Table 1.

Elongation (%)=$(L_1 L_0)/L_0 \times 100$

2) Gel Fraction

First, each of the aqueous dispersion adhesive compositions (about 100 mg) of Examples 1 to 11 and Comparative Examples 1 to 6 was wrapped with a Teflon sheet (registered trademark, product number: NTF-1122) and a kite string (12 cm), weights of which were previously measured, and the weight of the resulting parcel was measured. The parcel was then placed in a 50 ml-glass bottle and the glass bottle was charged with a sufficient amount of ethyl acetate. After the glass bottle was sealed, the parcel was kept immersed at room temperature for 7 days. Thereafter, the immersed parcel was taken out of the glass bottle, ethyl acetate adhered to the Teflon sheet (registered trademark) was wiped off, and the parcel was dried at 130° C. for 2 hours by a drying machine. Then, the weight of the dried parcel was measured. The gel fraction was then calculated by the following equation:

Gel Fraction (% by weight)=$\{(C-A)/(B-A)\} \times 100$

The symbols in the equation are as follows:

A (g): Total weight of a Teflon sheet (registered trademark) and a kite string (tare weight)

B (g): Total weight of a Teflon sheet (registered trademark), a kite string and an aqueous dispersion adhesive composition before being immersed in ethyl acetate and dried C (g): Total weight of a Teflon sheet (registered trademark), a kite string and an aqueous dispersion adhesive composition after being immersed in ethyl acetate and dried The results are shown in Table 1.

3) Adhesion to Glass

Each of the adhesive optical films obtained in Examples 1 to 11 and Comparative Examples 1 to 6 was cut into pieces having a width of 25 mm, and the resulting cut film was stuck onto a glass plate (Corning #1737, manufactured by Corning Inc.). The stuck film was then contact-bonded during one reciprocation of a rubber roller having a load of 2 kg. The resulting test piece was allowed to stand in an autoclave at 50° C. under 0.5 MPa for 15 minutes and then cooled to 25° C. to measure a 90° peel adhesion (peel rate: 10 mm/min) (initial adhesion).

After being allowed to stand in the autoclave, the test piece was further allowed to stand each in an atmosphere at 60° C. and an atmosphere at 60° C./90% RH for 40 hours and then cooled to 25° C. to measure a 90° peel adhesion (peel rate: 10 mm/min). The results are shown in Table 1.

The higher the peel adhesion is, the better adhesion to glass is.

4) Thermal Foaming of Adhesive Optical Film

Each of the adhesive optical films of Examples 1 to 11 and Comparative Examples 1 to 6 was cut into pieces having a size of 235 mm (width)×310 mm (length), and the resulting cut film was stuck onto a 0.7 mm-thick glass plate (Corning #1737, manufactured by Corning Inc.). The resulting test piece was allowed to stand in an autoclave at 50° C. under 0.5 MPa for 15 minutes and thereafter allowed to stand under an atmosphere heated to 90° C. for 500 hours. Then, whether the adhesive optical film was foamed or not was visually observed.

The presence or absence of foaming of the adhesive optical film was observed according to the following criteria:

A: Foaming was not observed.
B: Foaming was slightly observed.
C: Foaming was observed.

TABLE 1

|  |  |  |  |  |  | Examples/Comparative Examples | | | | |
|---|---|---|---|---|---|---|---|---|---|---|
|  |  |  |  |  |  | Ex. 1 | Ex. 2 | Ex. 3 | Ex. 4 | Ex. 5 |
| Blending Formulation of Aqueous Dispersion Adhesive Composition | Aqueous Dispersion Type Copolymer | Reaction Component | Alkyl(meth)acrylate Ester | Butyl Acrylate |  | 92 | 92 | 88 | 88 | 88 |
|  |  |  | (Meth)acrylic Acid | Acrylic Acid |  | — | — | 5 | 5 | 5 |
|  |  |  |  | Methacrylic Acid |  | 6 | 6 | — | — | — |
|  |  |  | Phosphoric Acid Group-Containing Vinyl Monomer | PAM-200 | Blending Amount Expressed in Parts | 2 | 2 | 2 | 2 | 2 |
|  |  |  |  |  | Phosphoric Acid Group Concentration [mmol/g] | 0.04 | 0.04 | 0.04 | 0.04 | 0.04 |
|  |  |  | Alkoxysilyl Group-Containing Vinyl Monomer | KBM-503 |  | 0.03 | 0.03 | 0.03 | 0.03 | 0.03 |
|  |  |  | Copolymerizable Vinyl Monomer | Cyclohexyl methacrylate |  | — | — | 5 | 5 | 5 |
|  |  | Emulsifier |  | AQUALON HS-10 |  | 3 | 3 | 3 | 3 | 3 |
|  |  | Polymerization Initiator |  | Ammonium Persulfate*[1] |  | 0.03/ 0.07 | 0.03/ 0.07 | 0.01/ 0.07 | 0.01/ 0.07 | 0.01/ 0.05 |
|  |  | <Polymerization Condition> |  | Polymerization Temperature (° C.)*[2] |  | 65/ 70 | 65/ 70 | 65/ 75 | 65/ 75 | 65/ 75 |
| Crosslinking Agent | Carbodiimide Crosslinking Agent |  |  | CARBODILITE V-04 |  | 0.1 | 0.3 | 0.5 | 1 | 0.5 |
|  |  |  |  | CARBODILITE E-04 |  | — | — | — | — | — |

TABLE 1-continued

|  |  |  |  |  |  |  |  |  |  |
|---|---|---|---|---|---|---|---|---|---|
| Evaluation of Physical Properties | Elongation for 2 Hours (%) |  | 23° C. (Room Temperature) |  | 50 | 30 | 80 | 80 | 70 |
|  |  |  | 90° C. |  | 190 | 70 | 180 | 100 | 170 |
|  | Gel fraction (wt. %) |  |  |  | 84.3 | 85.2 | 86.1 | 89.3 | 90.5 |
|  | Adhesion to Glass (Peel Adhesion [N/25mm]) | Peel Rate [10 mm/min] | Initial State |  | 6.8 | 2.9 | 9.4 | 8.1 | 3.5 |
|  |  |  | 60° C. × 40 h |  | 11.0 | 11.3 | 20.5 | 17.5 | 22.2 |
|  |  |  | 60° C./90% RH × 40 h |  | 4.0 | 3.5 | 4.6 | 5.1 | 9.6 |
|  | Thermal Foaming |  | 90° C. × 500 h |  | A | A | A | A | A |

|  |  |  |  |  |  | Examples/Comparative Examples ||||| 
|---|---|---|---|---|---|---|---|---|---|---|
|  |  |  |  |  |  | Ex. 6 | Ex. 7 | Ex. 8 | Ex. 9 | Ex. 10 |
| Blending Formulation of Aqueous Dispersion Adhesive Composition | Aqueous Dispersion Type Copolymer | Reaction Component | Alkyl(meth)acrylate Ester | Butyl Acrylate |  | 88 | 88 | 88 | 88 | 88 |
|  |  |  | (Meth)acrylic Acid | Acrylic Acid |  | 5 | 5 | 5 | 5 | 5 |
|  |  |  |  | Methacrylic Acid |  | — | — | — | — | — |
|  |  |  | Phosphoric Acid Group-Containing Vinyl Monomer | PAM-200 | Blending Amount Expressed in Parts | 2 | 2 | 2 | 2 | 2 |
|  |  |  |  |  | Phosphoric Acid Group Concentration [mmol/g] | 0.04 | 0.04 | 0.04 | 0.04 | 0.04 |
|  |  |  | Alkoxysilyl Group-Containing Vinyl Monomer | KBM-503 |  | 0.03 | 0.03 | 0.03 | 0.03 | 0.03 |
|  |  |  | Copolymerizable Vinyl Monomer | Cyclohexyl methacrylate |  | 5 | 5 | 5 | 5 | 5 |
|  |  | Emulsifier |  | AQUALON HS-10 |  | 3 | 3 | 3 | 3 | 3 |
|  |  | Polymerization Initiator |  | Ammonium Persulfate*[1] |  | 0.01/ 0.07 | 0.01/ 0.07 | 0.01/ 0.07 | 0.01/ 0.07 | 0.01/ 0.07 |
|  |  | <Polymerization Condition> |  | Polymerization Temperature (° C.)*[2] |  | 65/ 75 | 65/ 75 | 65/ 75 | 65/ 75 | 65/ 75 |
|  | Crosslinking Agent | Carbodiimide Crosslinking Agent |  | CARBODILITE V-04 |  | 1 | 2 | 3 | — | — |
|  |  |  |  | CARBODILITE E-04 |  | — | — | — | 1 | 0.5 |
| Evaluation of Physical Properties | Elongation for 2 Hours (%) |  | 23° C. (Room Temperature) |  | 50 | 30 | 30 | 50 | 60 |
|  |  |  | 90° C. |  | 150 | 50 | 40 | 60 | 100 |
|  | Gel fraction (wt. %) |  |  |  | 92.1 | 91.9 | 91.7 | 87.4 | 86.2 |
|  | Adhesion to Glass (Peel Adhesion [N/25mm]) | Peel Rate [10 mm/min] | Initial State |  | 5.9 | 4.3 | 8.8 | 8.1 | 8.5 |
|  |  |  | 60° C. × 40 h |  | 22.8 | 16.5 | 17.3 | 20.1 | 21.8 |
|  |  |  | 60° C./90% RH × 40 h |  | 7.0 | 4.2 | 2.9 | 4.8 | 5.6 |
|  | Thermal Foaming |  | 90° C. × 500 h |  | A | A | A | A | A |

|  |  |  |  |  |  | Examples/Comparative Examples ||||
|---|---|---|---|---|---|---|---|---|---|
|  |  |  |  |  |  | Ex. 11 | Comp. Ex. 1 | Comp. Ex. 2 | Comp. Ex. 3 |
| Blending Formulation of Aqueous Dispersion Adhesive Composition | Aqueous Dispersion Type Copolymer | Reaction Component | Alkyl(meth)acrylate Ester | Butyl Acrylate |  | 88 | 88 | 92 | 88 |
|  |  |  | (Meth)acrylic Acid | Acrylic Acid |  | 5 | 5 | — | 5 |
|  |  |  |  | Methacrylic Acid |  | — | — | 6 | — |
|  |  |  | Phosphoric Acid Group-Containing Vinyl Monomer | PAM-200 | Blending Amount Expressed in Parts | 2 | 2 | 2 | 2 |
|  |  |  |  |  | Phosphoric Acid Group Concentration [mmol/g] | 0.04 | 0.04 | 0.04 | 0.04 |
|  |  |  | Alkoxysilyl Group-Containing Vinyl Monomer | KBM-503 |  | 0.03 | 0.03 | 0.03 | 0.03 |
|  |  |  | Copolymerizable Vinyl Monomer | Cyclohexyl methacrylate |  | 5 | 5 | 5 | 5 |
|  |  | Emulsifier |  | AQUALON HS-10 |  | 3 | 3 | 3 | 3 |
|  |  | Polymerization Initiator |  | Ammonium Persulfate*[1] |  | 0.01/ 0.07 | 0.03/ 0.07 | 0.01/ 0.07 | 0.01/ 0.07 |
|  |  | <Polymerization Condition> |  | Polymerization Temperature (° C.)*[2] |  | 65/ 75 | 65/ 70 | 65/ 75 | 65/ 75 |
|  | Crosslinking Agent | Carbodiimide Crosslinking Agent |  | CARBODILITE V-04 |  | — | — | — | 0.0005 |
|  |  |  |  | CARBODILITE E-04 |  | 2 | — | — | — |

TABLE 1-continued

| Evaluation of Physical Properties | Elongation for 2 Hours (%) | | 23° C. (Room Temperature) | 30 | 70 | 90 | 70 |
|---|---|---|---|---|---|---|---|
| | | | 90° C. | 40 | 380 | 500 | 550 |
| | Gel fraction (wt. %) | | | 90.8 | 83.9 | 86.3 | 86.1 |
| | Adhesion to Glass (Peel Adhesion [N/25mm]) | Peel Rate [10 mm/min] | Initial State | 6.8 | 4.7 | 9.8 | 6.2 |
| | | | 60° C. × 40 h | 15.7 | 8.4 | 17.3 | 14.0 |
| | | | 60° C./90% RH × 40 h | 4.3 | 4.8 | 5.5 | 5.6 |
| | Thermal Foaming | | 90° C. × 500 h | A | C | C | C |

|  |  |  |  |  |  | Examples/Comparative Examples | | |
|---|---|---|---|---|---|---|---|---|
|  |  |  |  |  |  | Comp. Ex. 5 | Comp. Ex. 6 | Comp. Ex. 4 |
| Blending Formulation of Aqueous Dispersion Adhesive Composition | Aqueous Dispersion Type Copolymer | Reaction Component | Alkyl(meth)acrylate Ester | Butyl Acrylate | | 88 | 88 | 88 |
| | | | (Meth)acrylic Acid | Acrylic Acid | | 5 | 5 | 5 |
| | | | | Methacrylic Acid | | — | — | — |
| | | | Phosphoric Acid Group-Containing Vinyl Monomer | PAM-200 | Blending Amount Expressed in Parts | 2 | 2 | 2 |
| | | | | | Phosphoric Acid Group Concentration [mmol/g] | 0.04 | 0.04 | 0.04 |
| | | | Alkoxysilyl Group-Containing Vinyl Monomer | KBM-503 | | 0.03 | 0.03 | 0.03 |
| | | | Copolymerizable Vinyl Monomer | Cyclohexyl methacrylate | | 5 | 5 | 5 |
| | | Emulsifier | | AQUALON HS-10 | | 3 | 3 | 3 |
| | | Polymerization Initiator | | Ammonium Persulfate*[1] | | 0.01/0.07 | 0.01/0.07 | 0.01/0.07 |
| | | <Polymerization Condition> | | Polymerization Temperature (° C.)*[2] | | 65/75 | 65/75 | 65/75 |
| | Crosslinking Agent | Carbodiimide Crosslinking Agent | | CARBODILITE V-04 | | 0.001 | 0.05 | 5 |
| | | | | CARBODILITE E-04 | | — | — | — |
| Evaluation of Physical Properties | Elongation for 2 Hours (%) | | 23° C. (Room Temperature) | | | 80 | 60 | 20 |
| | | | 90° C. | | | 540 | 550 | 40 |
| | Gel fraction (wt. %) | | | | | 85.5 | 86.2 | 93.0 |
| | Adhesion to Glass (Peel Adhesion [N/25mm]) | Peel Rate [10 mm/min] | Initial State | | | 7.3 | 9.5 | 6.6 |
| | | | 60° C. × 40 h | | | 16.5 | 12.5 | 14.3 |
| | | | 60° C./90% RH × 40 h | | | 3.9 | 6.0 | 1.7 |
| | Thermal Foaming | | 90° C. × 500 h | | | C | C | A |

*[1]Blending Amount Expressed in Parts of Ammonium Persulfate Under Collective Polymerization/Blending Amount in Parts of Ammonium Persulfate Under Dropping Polymerization
*[2]Polymerization Temperature Under Collective Polymerization/Polymerization Temperature After Nitrogen Gas Replacement Under Dropping Polymerization The abbreviations in Table 1 are shown below.

PAM-200: Sipomer PAM-200 (mono-[poly(propylene oxide)methacrylate]phosphate ester (average polymerization degree of propylene oxide: about 5.0), manufactured by Rhodia Nicca, Ltd.)

KBM-503: 3-methacryloyloxypropyl-trimethoxysilane (manufactured by SHIN-ETSU CHEMICAL CO., LTD.)

HS-10: Reactive emulsifier AQUALON HS-10 (Dai-Ichi Kogyo Seiyaku Co., Ltd.)

V-04: Carbodiimide crosslinking agent (CARBODILITE V-04, water-soluble type, manufactured by NISSHINBO INDUSTRIES, INC.)

E-04: Carbodiimide crosslinking agent (CARBODILITE E-04, emulsion type, manufactured by NISSHINBO INDUSTRIES, INC.)

Example 12

Preparation of Monomer Preemulsion

In a vessel, 88 parts of butyl acrylate, 5 parts of acrylic acid, 5 parts of cyclohexyl methacrylate, 2 parts of mono[poly(propylene oxide)methacrylate]phosphate ester (average polymerization degree of propylene oxide: about 5.0, Sipomer PAM-200, manufactured by Rhodia Nicca, Ltd.) and 0.03 parts of 3-methacryloyloxypropyl-trimethoxysilane (KBM-503, manufactured by SHIN-ETSU CHEMICAL CO., LTD.) were charged and mixed to prepare a mixture of the reaction components. Subsequently, to 388 g of the reaction components thus prepared, 46.6 g of the reactive emulsifier AQUALON HS-10 (Dai-Ichi Kogyo Seiyaku Co., Ltd.) and 109 g of ion-exchange water were added, and the mixture was forcibly emulsified with stirring at 5000 (1/min) for 5 minutes using a homogenizer (manufactured by Tokusyu Kika Kogyo Co., Ltd.) to prepare a monomer preemulsion.

Preparation of Emulsion of Aqueous Dispersion Copolymer

In a reaction vessel equipped with a condenser tube, a nitrogen introducing tube, a thermometer and a stirrer, 54 g of the resulting monomer preemulsion and 456 g of ion-exchange water were charged, and subsequently, the atmosphere in the reaction vessel was replaced by nitrogen. Thereafter, 0.3 g of ammonium persulfate was added thereto, and the added mixture was polymerized at 65° C. for 2.5 hours. Then, 489.6 g of the residual monomer preemulsion was added dropwise in the reaction vessel over 3 hours, and thereafter, polymerization was conducted for 3 hours. Then, while the atmosphere was replaced with nitrogen, the polymerization was further conducted at 75° C. for 3 hours to obtain an emulsion (aqueous dispersion) of an aqueous dispersion copolymer having a solid content of 40%.

Preparation of Aqueous Dispersion Adhesive Composition

After the emulsion thus obtained was cooled to room temperature, the pH was adjusted to 8 by adding 10% aqueous ammonia, and further, 0.1 parts of an oxazoline crosslinking agent (EPOCROS WS-700, oxazoline group-containing acrylic polymer, water-soluble type, manufactured by NIPPON SHOKUBAI Co., Ltd.) was added to 100 parts of the solid content of the emulsion (aqueous dispersion copolymer) to prepare an aqueous dispersion adhesive composition.

Production of Adhesive Optical Film

The aqueous dispersion adhesive composition thus prepared was coated onto a release sheet made of polyester film which was treated with a release agent, and the coating was heated to dry at 100° C. for 2 minutes to form a 23 μm-thick adhesive layer.

A polarizing film previously subjected to an undercoating treatment was prepared. For the undercoating treatment, an undercoating solution was first prepared by diluting an oxazoline group-containing acrylic polymer (EPOCROS WS-700, manufactured by NIPPON SHOKUBAI Co., Ltd.) with a mixed solvent of water and ethanol (weight ratio: 1:1) so as to adjust the solid content to 2% by weight. Then, the undercoating solution was applied onto one side of the polarizing film using a wire bar #5, and the applied coating was heated to dry at 40° C. for 2 minutes to prepare an under coat layer.

The above polarizing film was produced by stretching a polyvinyl alcohol film in an aqueous iodine solution, drying the polyvinyl alcohol film, and thereafter, bonding a triacetyl cellulose film as a transparent protective film to both sides of the polarizer.

Subsequently, the polarizing film was laminated on a phase difference film (NAZ-#195-0.3, manufactured by Nitto Denko Corporation) so that a surface which is not provided with the under coat layer, and the phase difference film are stuck to each other. Thus, an optical film on which the polarizing film provided with the under coat layer, and the phase difference film were laminated was produced.

Then, the adhesive layer was laminated on the under coat layer of the optical film to produce an adhesive optical film (cf. FIG. 2).

Example 13

In the same manner as in Example 12, except that 0.3 parts of the oxazoline crosslinking agent (EPOCROS WS-700, manufactured by NIPPON SHOKUBAI Co., Ltd.) was added in place of 0.1 parts of the oxazoline crosslinking agent (EPOCROS WS-700, manufactured by NIPPON SHOKUBAI Co., Ltd.) in the preparation of the aqueous dispersion adhesive composition in Example 12, an aqueous dispersion adhesive composition was prepared and an adhesive optical film was then produced.

Example 14

In the same manner as in Example 12, except that 1 part of the oxazoline crosslinking agent (EPOCROS WS-700, manufactured by NIPPON SHOKUBAI Co., Ltd.) was added in place of 0.1 parts of the oxazoline crosslinking agent (EPOCROS WS-700, manufactured by NIPPON SHOKUBAI Co., Ltd.) in the preparation of the aqueous dispersion adhesive composition in Example 12, an aqueous dispersion adhesive composition was prepared and an adhesive optical film was then produced.

Comparative Example 7

In the same manner as in Example 12, except that 0.001 parts of the oxazoline crosslinking agent (EPOCROS WS-700, manufactured by NIPPON SHOKUBAI Co., Ltd.) was added in place of 0.1 parts of the oxazoline crosslinking agent (EPOCROS WS-700, manufactured by NIPPON SHOKUBAI Co., Ltd.) in the preparation of the aqueous dispersion adhesive composition in Example 12, an aqueous dispersion adhesive composition was prepared and an adhesive optical film was then produced.

Comparative Example 8

In the same manner as in Example 12, except that 0.05 parts of the oxazoline crosslinking agent (EPOCROS WS-700, manufactured by NIPPON SHOKUBAI Co., Ltd.) was added in place of 0.1 parts of the oxazoline crosslinking agent (EPOCROS WS-700, manufactured by NIPPON SHOKUBAI Co., Ltd.) in the preparation of the aqueous dispersion adhesive composition in Example 12, an aqueous dispersion adhesive composition was prepared and an adhesive optical film was then produced.

Comparative Example 9

In the same manner as in Example 12, except that 2 parts of the oxazoline crosslinking agent (EPOCROS WS-700, manufactured by NIPPON SHOKUBAI Co., Ltd.) was added in place of 0.1 parts of the oxazoline crosslinking agent (EPOCROS WS-700, manufactured by NIPPON SHOKUBAI Co., Ltd.) in the preparation of the aqueous dispersion adhesive composition in Example 12, an aqueous dispersion adhesive composition was prepared and an adhesive optical film was then produced.

Comparative Example 10

In the same manner as in Example 12, except that the oxazoline crosslinking agent was not added in the preparation of the aqueous dispersion adhesive composition in Example 12, an aqueous dispersion adhesive composition was prepared and an adhesive optical film was then produced.

Evaluation

5) Elongation of Adhesive Layer

As for each of the aqueous dispersion adhesive compositions in Examples 12 to 14 and Comparative Examples 7 to 10, the elongation for 2 hours at 23° C. and the elongation for 2 hours at 90° C. were calculated in the same manner as described above. The results are shown in Table 2.

6) Gel fraction

The gel fraction of each of the aqueous dispersion adhesive compositions in Examples 12 to 14 and Comparative Examples 7 to 10 was calculated in the same manner as described above. The results are shown in Table 2.

7) Adhesion to Glass

As for each of the adhesive optical films obtained by Examples 12 to 14 and Comparative Examples 7 to 10, 90° peel adhesion (peel rate: 10 mm/min) was measured in the same manner as described above. The result is shown in Table 2.

8) Thermal Foaming of Adhesive Optical Film

The presence or absence of foaming of each of the adhesive optical films in Examples 12 to 14 and Comparative Examples 7 to 10 was observed in the same manner as described above.

TABLE 2

| | | | | | | Examples/Comparative Examples | | | | | | |
|---|---|---|---|---|---|---|---|---|---|---|---|---|
| | | | | | | Ex. 12 | Ex. 13 | Ex. 14 | Comp. Ex. 7 | Comp. Ex. 8 | Comp. Ex. 9 | Comp. Ex. 10 |
| Blending Formulation of Aqueous Dispersion Adhesive Composition | Aqueous Dispersion Type Copolymer | Reaction Component | Alkyl(meth)acrylate Ester | Butyl Acrylate | | | | | 88 | | | |
| | | | (Meth)acrylic Acid | Acrylic Acid | | | | | 5 | | | |
| | | | Copolymerizable Vinyl Monomer | Cyclohexyl methacrylate | | | | | 5 | | | |
| | | | Phosphoric Acid Group-Containing Vinyl Monomer | PAM-200 | | | | | 2 | | | |
| | | | Alkoxysilyl Group-Containing Vinyl Monomer | KBM-503 | | | | | 0.03 | | | |
| | Crosslinking Agent | Oxazoline Crosslinking Agent | | EPOCROS WS-700 | 0.1 | 0.3 | 1 | 0.001 | 0.05 | 2 | — |
| Evaluation of Physical Properties | Elongation for 2 Hours (%) | | | 23° C. (Room Temperature) | 80 | 40 | 40 | 70 | 70 | 30 | 90 |
| | | | | 90° C. | 130 | 50 | 50 | 550 | 220 | 40 | 500 |
| | Gel Fraction (wt. %) | | | | 89.8 | 91.5 | 93.5 | 87.5 | 86.3 | 95.0 | 86.3 |
| | Adhesion to Glass (Peel Adhesion [N/25mm]) | Peel Rate [10 mm/min] | | Initial State | 9.0 | 8.8 | 4.6 | 5.5 | 7.7 | 2.7 | 9.8 |
| | | | | 60° C. × 40 hours | 13.8 | 15.8 | 11.5 | 19.4 | 16.6 | 5.9 | 17.3 |
| | | | | 60° C./ 90% RH × 40 hours | 3.4 | 1.6 | 1.0 | 5.1 | 4.9 | 0.5 | 5.5 |
| | Thermal Foaming | | | 90° C. × 500 hours | A | A | A | C | B | A | C |

The abbreviations in Table 2 are shown below.

PAM-200: Sipomer PAM-200 (mono-[poly(propylene oxide)methacrylate]phosphate ester (average polymerization degree of propylene oxide: about 5.0), manufactured by Rhodia Nicca, Ltd.)

KBM-503: 3-methacryloyloxypropyl-trimethoxysilane (manufactured by SHIN-ETSU CHEMICAL CO., LTD.)

EPOCROS WS-700: Oxazoline group-containing acrylic polymer (water-soluble type, solid content: 25%, main chain: acrylic, pH 7 to 9, oxazoline value: 220 g solid/eq., manufactured by NIPPON SHOKUBAI Co., Ltd.)

While the illustrative embodiments of the present invention are provided in the above description, such is for illustrative purpose only and it is not to be construed limitative. Modification and variation of the present invention that will be obvious to those skilled in the art is to be covered by the following claims.

What is claimed is:

1. An aqueous dispersion adhesive composition comprising:

an aqueous dispersion copolymer obtained by reacting of a reaction component comprising alkyl (meth)acrylate whose linear or branched alkyl group has 4 to 18 carbon atoms, (meth)acrylic acid, a phosphoric acid group-containing vinyl monomer and an alkoxysilyl group-containing vinyl monomer; and a crosslinking agent having reactivity with a carboxyl group, wherein an amount of the crosslinking agent is from 0.07 to 4 parts by weight per 100 parts by weight of the aqueous dispersion copolymer, and an elongation at 90° C. based on the following test of an adhesive layer made of the aqueous dispersion adhesive composition is 200% or less, wherein the test comprises subjecting the aqueous dispersion adhesive composition to heating to prepare an adhesive layer, and the adhesive layer thus prepared is formed into a cylindrical column shape having a cross section of 4.6 mm$^2$ and a length of 30 mm to prepare a test piece, subsequently, the test piece is allowed to stand at 90° C. for 1 hour, and thereafter, an initial length $L_0$ of the test piece is measured, then, the test piece with one end fixed and the other end attached a 12 g-weight, is hung down vertically at 90° C. for 2 hours, and a length $L_1$ (mm) of the test piece after the 2-hour hanging is measured, and the elongation is calculated by the following equation:

$$\text{Elongation (\%)} = (L_1 - L_0)/L_0 \times 100.$$

2. The aqueous dispersion adhesive composition according to claim 1, wherein the crosslinking agent is a compound having a carbodiimide group.

3. The aqueous dispersion adhesive composition according to claim 1, wherein the crosslinking agent is an oxazoline group-containing crosslinking agent and the amount of the crosslinking agent is from 0.07 to 1.5 parts by weight per 100 parts by weight of the aqueous dispersion copolymer.

4. The aqueous dispersion adhesive composition according to claim 1, wherein the aqueous dispersion adhesive composition has a gel fraction of from 80 to 95% by weight when being immersed in ethyl acetate.

5. An adhesive film comprising an adhesive layer made of an aqueous dispersion adhesive composition, the aqueous dispersion adhesive composition comprising:

an aqueous dispersion copolymer obtained by reacting of a reaction component comprising alkyl (meth) acrylate whose linear or branched alkyl group has 4 to 18 carbon atoms, (meth)acrylic acid, a phosphoric acid group-containing vinyl monomer and an alkoxysilyl group-containing vinyl monomer; and a crosslinking agent having reactivity with a carboxyl group, wherein an amount of the crosslinking agent is from 0.07 to 4 parts by weight per 100 parts by weight of the aqueous dispersion copolymer, and an elongation at 90° C. based on the following test of the adhesive layer is 200% or less, wherein the test comprises subjecting the aqueous dispersion adhesive composition to heating to prepare an adhesive layer, and the adhesive layer thus prepared is formed into a cylindrical column shape having a cross section of 4.6 mm$^2$ and a length of 30 mm to prepare a test piece, subsequently, the test piece is allowed to stand at 90° C. for 1 hour, and thereafter, an initial length $L_0$ of the test piece is measured, then, the test piece with one end fixed and the other end attached a 12 g-weight, is hung down vertically at 90° C. for 2 hours, and a length $L_1$ (mm) of the test piece after the 2-hour hanging is measured, and the elongation is calculated by the following equation:

Elongation (%)=$(L_1-L_0)/L_0 \times 100$.

6. The adhesive film according to claim 5, wherein the crosslinking agent is a compound having a carbodiimide group.

7. The adhesive film according to claim 5, wherein
the crosslinking agent is an oxazoline group-containing crosslinking agent and
the amount of the crosslinking agent is from 0.07 to 1.5 parts by weight per 100 parts by weight of the aqueous dispersion copolymer.

* * * * *

UNITED STATES PATENT AND TRADEMARK OFFICE
CERTIFICATE OF CORRECTION

| | | |
|---|---|---|
| PATENT NO. | : 7,858,709 B2 | Page 1 of 1 |
| APPLICATION NO. | : 12/149445 | |
| DATED | : December 28, 2010 | |
| INVENTOR(S) | : Takahashi et al. | |

It is certified that error appears in the above-identified patent and that said Letters Patent is hereby corrected as shown below:

On the Title Page

- The first named inventor as currently stated on the patent on page 1, Item 12 is Takahasi et al. Please correct the first named inventor to be listed as --TAKAHASHI ET AL.--.

- The first named inventor as currently stated on the patent on page 1, Item 75 is Toshitaka Takahasi. Please correct the first named inventor to be listed as --TOSHITAKA TAKAHASHI--.

Signed and Sealed this
Eighth Day of March, 2011

David J. Kappos
*Director of the United States Patent and Trademark Office*